US008583340B2

(12) United States Patent
Hoffmann

(10) Patent No.: US 8,583,340 B2
(45) Date of Patent: Nov. 12, 2013

(54) MODEL BASED METHOD TO ASSESS ROAD CURVATURE EFFECT ON TRAVEL TIME AND COMFORT FOR ROUTE PLANNING

(71) Applicant: Palo Alto Research Center Incorporated, Palo Alto, CA (US)

(72) Inventor: Gabriel M. Hoffmann, Mountain View, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 13/633,414

(22) Filed: Oct. 2, 2012

(65) Prior Publication Data
US 2013/0090823 A1 Apr. 11, 2013

Related U.S. Application Data

(62) Division of application No. 12/544,706, filed on Aug. 20, 2009, now Pat. No. 8,306,732.

(60) Provisional application No. 61/234,898, filed on Aug. 18, 2009.

(51) Int. Cl.
*G06F 7/70* (2006.01)
(52) U.S. Cl.
USPC ............ 701/70; 701/408; 701/532; 701/533; 701/423; 340/995.19; 340/995.22; 340/995.23
(58) Field of Classification Search
USPC ......... 701/201, 408, 410, 424, 425, 468, 467; 340/995.19, 995.22, 995.23
See application file for complete search history.

(56) References Cited

U.S. PATENT DOCUMENTS

| | | | | |
|---|---|---|---|---|
| 4,361,202 | A * | 11/1982 | Minovitch | 180/168 |
| 7,010,412 | B1 * | 3/2006 | Song | 701/80 |
| 7,513,508 | B2 * | 4/2009 | Malit | 280/5.518 |
| 2004/0049339 | A1 * | 3/2004 | Kober et al. | 701/209 |
| 2008/0004797 | A1 | 1/2008 | Katzer | |

FOREIGN PATENT DOCUMENTS

| | | |
|---|---|---|
| EP | 1873493 A1 | 1/2008 |
| EP | 1890110 A2 | 2/2008 |
| WO | 0203351 A1 | 1/2002 |

OTHER PUBLICATIONS

Hoffmann et al., "Quadrotor Helicopter Trajectory Tracking Control", The Proceedings of the AIAA Guidance, Navigation, and Control Conference, Honolulu, HI, AIAA Paper No. 2008-7410, Aug. 18-21, 2008.
McCauley et al., "Motion Sickness Incidence: Exploratory Studies of Habituation, Pitch and Roll, and the Refinement of a Mathematical Model", Prepared for Office of Naval Research, Dept. of the Navy, Apr. 1976.

* cited by examiner

Primary Examiner — Redhwan K Mawari
(74) Attorney, Agent, or Firm — Fay Sharpe LLP

(57) ABSTRACT

Methods and systems for assessing the effect of road curvature on the travel time and the comfort level of a path determined by a ground based route planning system. The methods and systems identify a path and determine an allowable speed profile of the path, wherein the allowable speed profile satisfies a cross track acceleration constraint. Thereafter, the methods and systems determine an optimal speed profile of the path, wherein the optimal speed profile satisfies both an along track acceleration constraint and a speed constraint. Using the optimal speed profile, the road curvature of a path may be factored into a determination of the traversal time of the path. Additionally, using the optimal speed profile, the road curvature of a path may be used to derive a comfort level of the path. The optimal speed profile may be further used to provide driver assistance.

10 Claims, 18 Drawing Sheets

US 8,583,340 B2

MODEL BASED METHOD TO ASSESS ROAD CURVATURE EFFECT ON TRAVEL TIME AND COMFORT FOR ROUTE PLANNING

This application claims the priority, as a divisional, of U.S. application Ser. No. 12/544,706, filed Aug. 20, 2009, now U.S. Published Application No. 2011/0046877A1, which application claims priority to U.S. Provisional Application Ser. No. 61/234,898, Filed Aug. 18, 2009, the disclosures of each of which are incorporated herein by reference in their entirety.

TECHNICAL FIELD

The present application relates generally to ground based route planning. Specifically, the present application provides methods and systems for assessing the effect of road curvature on the travel time and the comfort level of a path determined by a ground based route planning system. However, it is to be appreciated that the presently disclosed subject matter is equally amenable to other like applications and/or environments.

BACKGROUND

Traditional ground based route planning systems and/or methods, such as MapQuest™, generally seek to provide the shortest path or fastest between two points. In doing so, such systems rely largely upon the posted speed limits for the roads connecting the two points and assume the driver will approximate the posted speed limits while traversing the path. However, this assumption is a misnomer. Namely, when approaching a turn or a curved road, one generally needs to slow down, such that even though the posted speed limit for a road might read 50 MPH, the user can only safely travel at 20 MPH. As a corollary, after one has slowed down and traversed the turn or the curve, one still needs to reaccelerate to the speed limit, which takes additional time. Accordingly, failure to take into account the curvature of a road can lead to an inaccurate approximation of the time required to traverse a path, whereby it would be advantageous to have a system and/or method that factors the curvature of a path into the estimated time for traversal of the path. It should also be mentioned that another factor that will affect assumption of posted speed limits is the existence of stop signs and stop lights which can impose either speed constraints or expected speed constraints.

Some ground based route planning systems and/or methods refine estimated traversal times along a path using recorded data from professional drivers. However, such refinements are specific to driver preferences and dependent upon traffic conditions. Further, such refinements are labor intensive and expensive in that they require a driver to traverse every road along a path. Accordingly, it would be advantageous to have a system and/or method that is agnostic to driver preferences and specific traffic conditions, and does not require a driver to traverse all roads that may be used for a path.

Notwithstanding the speed of traversal, traditional ground based route planning systems and/or methods generally fail to take into account considerations pertaining to the comfort level a user of a ground based route planning system will experience while traversing a path. Instead, such systems focus on the shortest or fastest path between two points. However, it seems axiomatic that many users would be willing to trade a few minutes of additional travel time, or a few extra miles of travel, for an increased comfort and safety level while traversing a path. Accordingly, it would be advantageous to have a ground based route planning system and/or method that takes into consideration the comfort level and safety a user will experience while traversing a path.

While some ground based route planning systems may take into account driver comfort by virtue of encouraging the use of highways, they fail to take into account one particular consideration directly affecting the comfort level of a user while traversing a path: the curvature of the path. Namely, a NASA study found that the risk of car sickness is increased by acceleration at particular frequencies. Generally, these frequencies fall around the 0.2 hertz mark. As the curvature variation of a road directly effects the acceleration of a vehicle, both cross track and along track, the curvature of a road may have an effect on the comfort level of an individual. Additionally, curvy roads present more of a driving challenge because of the increased alertness required to traverse such roads, whereby the curvature of a road may affect the comfort level of an individual in spite of motion sickness. On the flip side, some individuals might find curvy roads more comfortable than straight roads due to increased driver awareness and enjoyment from traversing curvy roads. Therefore, for at least the foregoing reasons, the curvature of a road has an effect on the comfort level of a user, whereby it would be advantageous to have a system and/or method that considers the curvature of roads while determining a path and/or notifies the user of any potential discomfort that might occur.

The present application contemplates a new and improved system and/or method which overcomes the above-referenced problems and others

BRIEF DESCRIPTION

In accordance with one aspect of the present application, a method and system for assessing road curvature of a path is disclosed. The path includes a plurality of waypoints. An allowable speed profile of the path is determined. The allowable speed profile includes an allowable speed for the each of the plurality of waypoints. The allowable speed for the each of the plurality of waypoints satisfies a cross track acceleration constraint. An optimal speed profile of the path is also determined. The optimal speed profile includes an optimal speed for the each of the plurality of waypoints. The optimal speed for the each of the plurality of waypoints satisfies both an along track acceleration constraint and a speed constraint. The speed constraint is a minimum of the desired speed and the allowable speed.

DETAILED DESCRIPTION

An exemplary method for assessing road curvature of a path presupposes a path generated by a ground based route planning system. The ground based route planning system refers to electronic services such as MapQuest™, TomTom™, and other like services. Further, the ground based route planning system may refer to a website (e.g., MapQuest™), a handheld GPS unit (e.g., TomTom™), or other like variations thereon.

Generally, a ground based route planning system generates a path between a start address and an end address entered by the user of the ground based route planning system. Naturally, under such application, the generated path is generally used to generate driving directions and/or a driving time, such that the generated path tracks along roads, highways, freeways, and other like ground based paths. Accordingly, the generated path may be comprised of a plurality of paths (or sub-paths) corresponding to individual roads, highways, etc. However, as should be appreciated, the present application is equally amenable to "off-road" path generation, or variations thereon, where the user of a ground based route planning system may, for example, enter start coordinates and end coordinates.

Notwithstanding the application of the ground based route planning system, the path generally refers to the fastest and/or the shortest path between two points. As the skilled artisan will appreciate, variations upon the foregoing types of paths are equally amenable to the present application. The path may be generated using A* with visibility graphs, fast marching with gradient descent, or any other algorithm operative to generate a path between two points. However, under one embodiment of the present application, low time complexity algorithms are used. The path further includes a plurality of waypoints, where the waypoints correspond to points along the path generated by the ground based route planning system.

Figure 1:
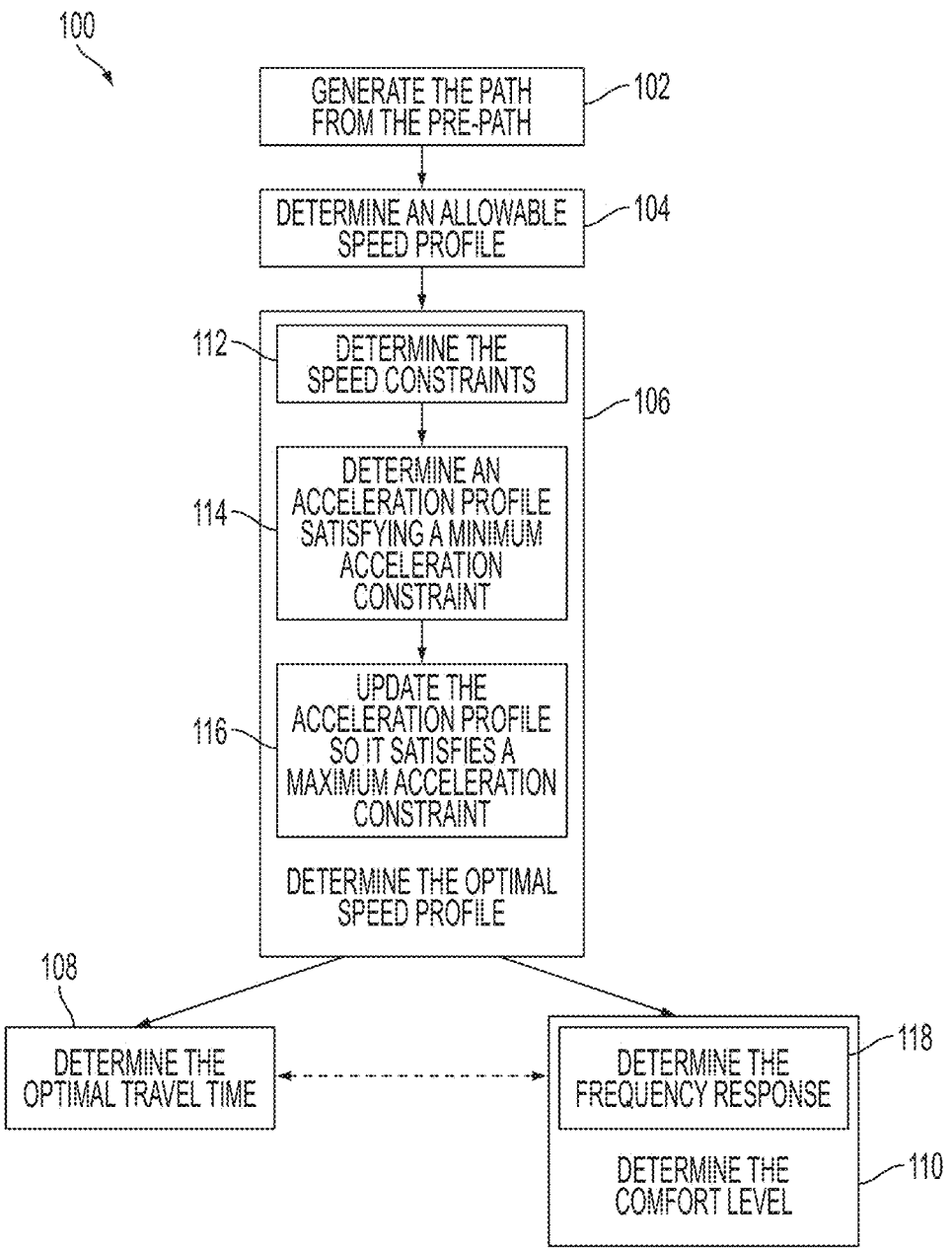
FIG. 1 is an exemplary method for assessing road curvature of a path.
Figure 2:
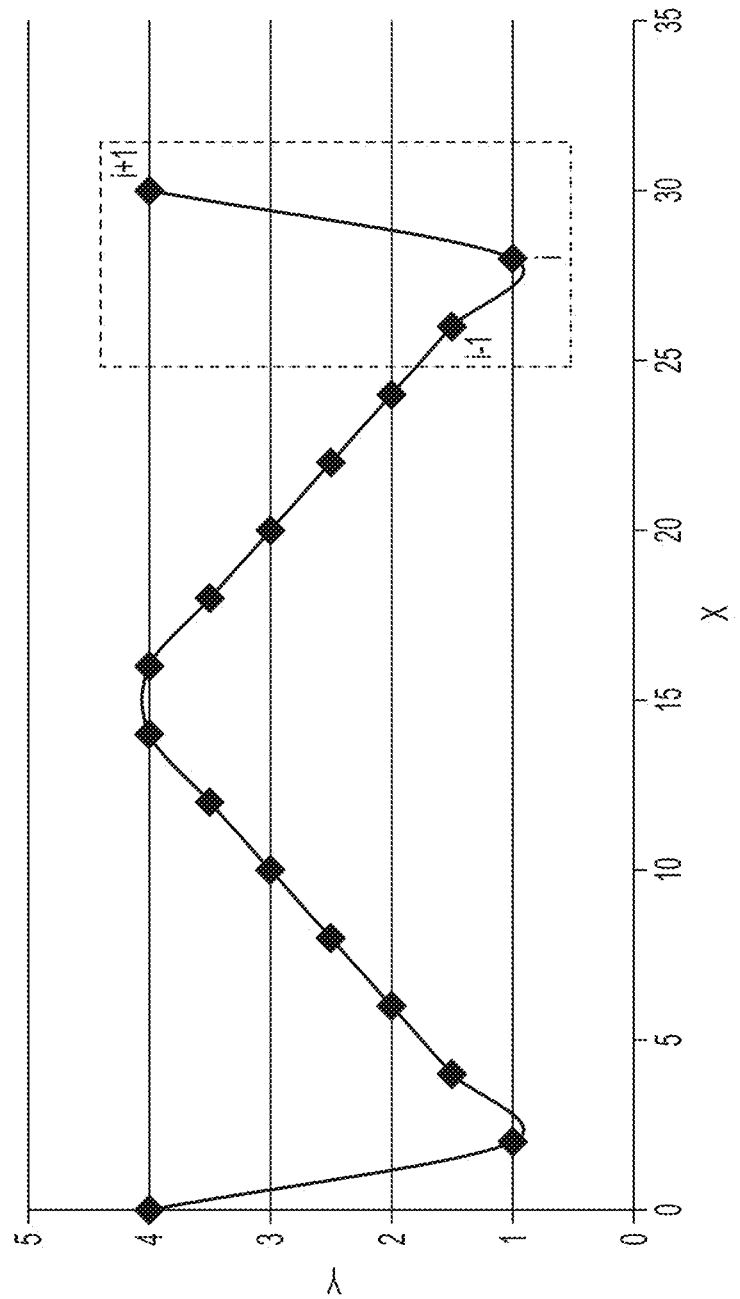
FIG. 2 is a graphical illustration of a path.
Figure 3:
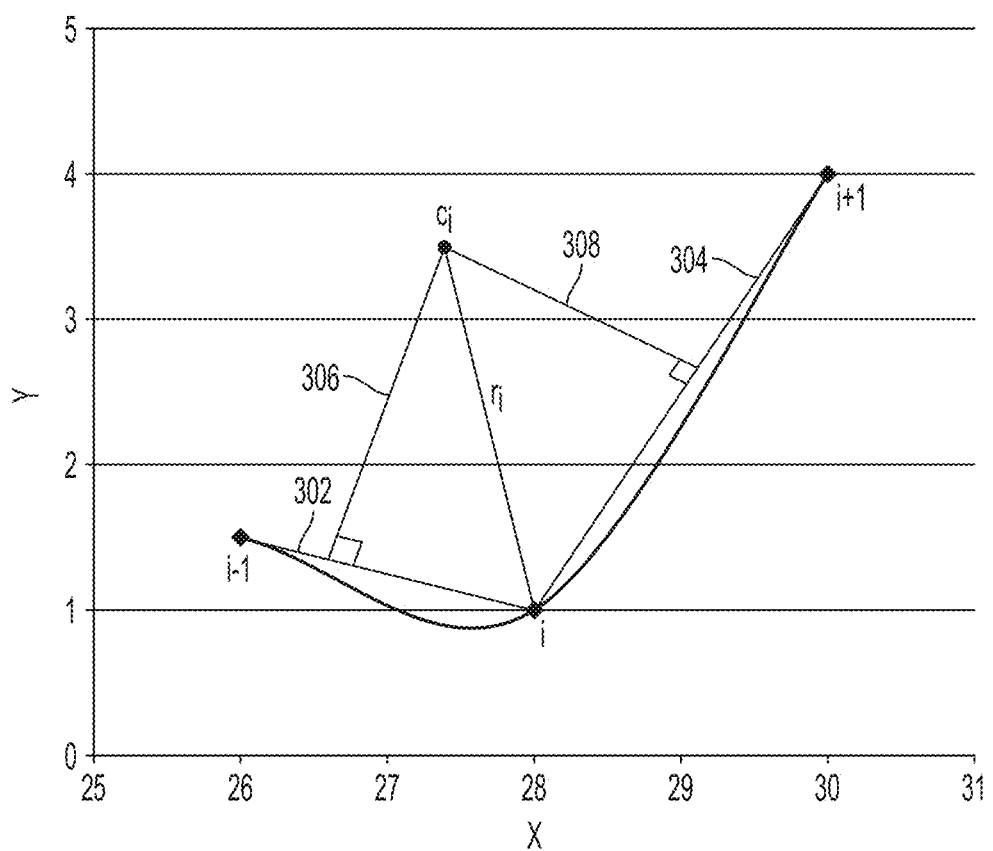
FIG. 3 is a graphical illustration of a portion of the path of FIG. 2 illustrating the determination of the radius of curvature of a waypoint.
Figure 4:
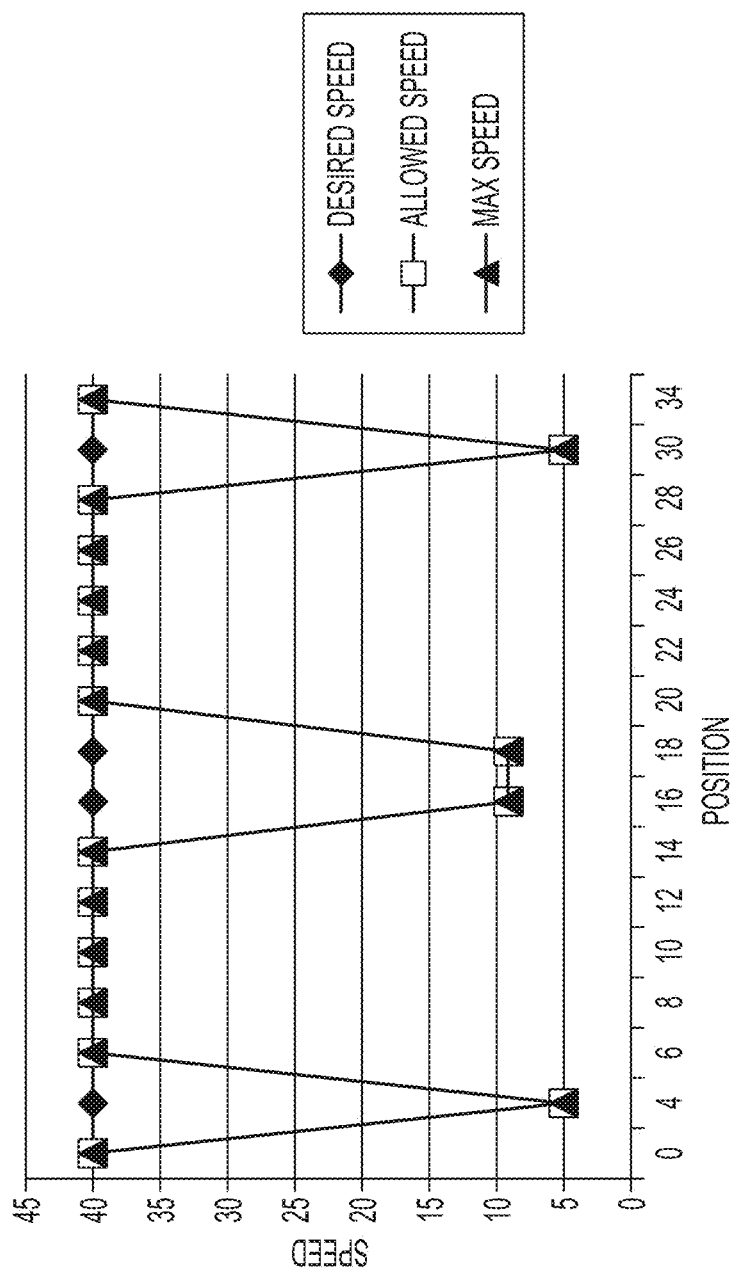
FIG. 4 is a graphical illustration of the speed restraints placed upon the traversal of the path in FIG. 2.
Figure 5:
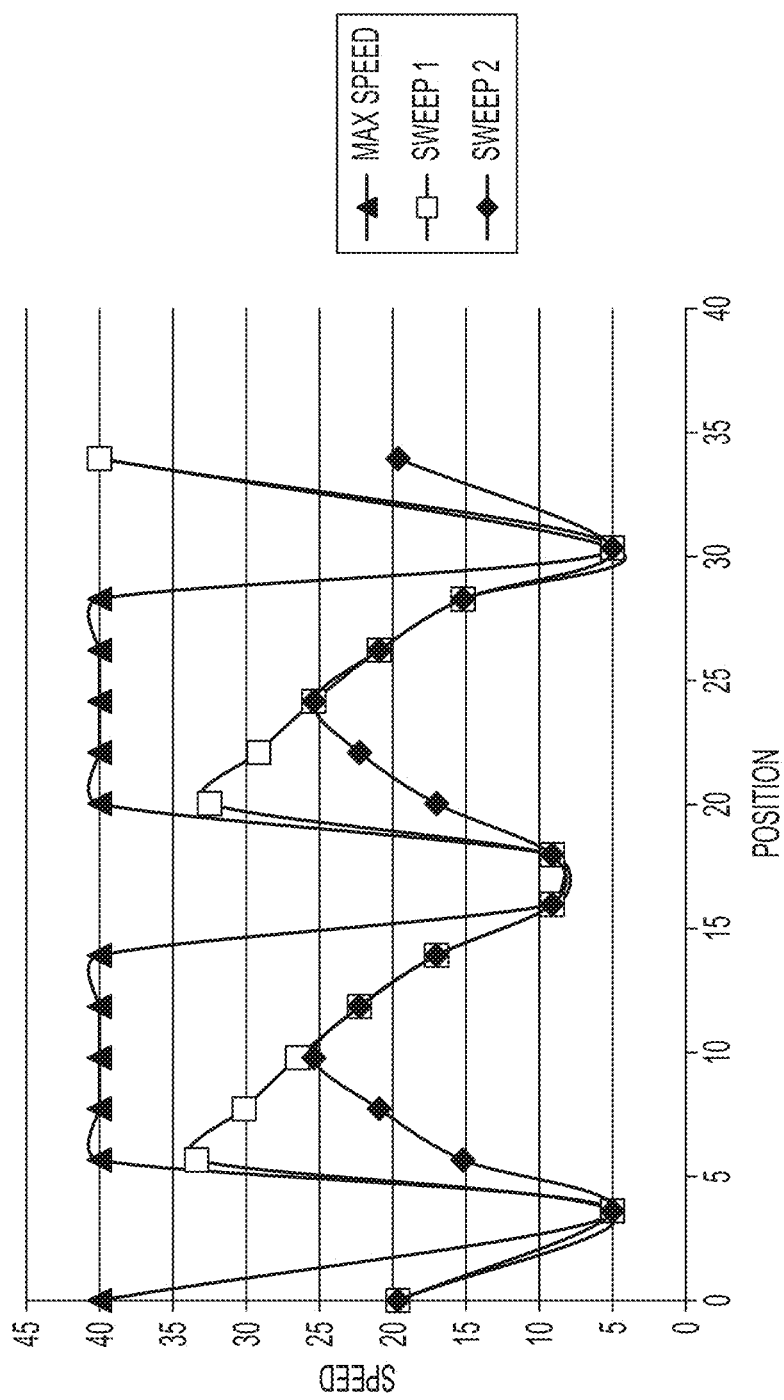
FIG. 5 is a graphical illustration of the optimal speed profile of the path of FIG. 2.

In view of this, the exemplary method will be described as shown in FIG. 1. The exemplary method seeks to assess the curvature of a path generated by, for example, MapQuest™ to determine the travel time for the path and/or the comfort level of the path. In explaining the exemplary method, the steps of FIG. 1 will be described in conjunction with FIGS. 2-5, as appropriate. As will become more apparent, each point in FIGS. 2-5 corresponds to a waypoint. FIG. 2 is a graphical illustration of a path. FIG. 3 is a graphical illustration of a portion of the path of FIG. 2 illustrating the determination of the radius of curvature of a waypoint. FIG. 4 is a graphical illustration of the speed constraints placed upon the traversal of the path in FIG. 2. FIG. 5 is a graphical illustration of the optimal speed profile of the graph of FIG. 2.

With reference to FIG. 1, an exemplary method for assessing road curvature of a path is disclosed. The method includes the steps of generating the path from a pre-path (optional step 102); determining an allowable speed profile (Step 104); and determining an optimal speed profile (Step 106). The method further includes determining the optimal travel time of the optimal speed profile (Step 108), and determining comfort level (Step 110). The step of determining an optimal speed profile (Step 106) includes the steps of determining speed constraints (Step 112), determining a speed profile satisfying a negative acceleration constraint (Step 114), and updating the speed profile to satisfy a positive acceleration constraint (Step 116). The step of determining the comfort level (Step 110) includes the step of determining the frequency response of the path (Step 118).

The first, albeit optional, step is generating a path from a pre-path (Step 102). The pre-path is the path provided by the ground based route planning system. This step entails generating a finer sampling of waypoints than the pre-path, such that the finer sampling of waypoints defines a space-indexed path, $w \in \mathbb{R}^{N \times 2}$, with a curvature that can be numerically estimated. N is the number of waypoints. As mentioned above, the pre-path may be either time-index or space-indexed. If the pre-path is time-index, it is converted into a space-indexed path. Further, as will be appreciated, the finer the sample of waypoints, the more accurate the exemplary method will be able to assess the road curvature. However, while a finer sampling of waypoints is generally better, it comes at the cost of an increase in computation time. Accordingly, the amount of discretization of the pre-path must be chosen in view of the competing interests of computation time and accuracy.

Assuming a space-indexed path of waypoints, the next step is to determine an allowable speed profile for the path (Step 104). This step entails computing, using the approximate path curvature, a maximum allowable speed $v_{i,allow}$ at every waypoint $w_i = (x_i, y_i)$ that satisfies a cross track acceleration constraint $a_{max}$. As should be appreciated, the cross track acceleration constraint $a_{max}$ depends upon a number of considerations, including, but not limited to, comfort, vehicle capabilities, road conditions, and/or other like considerations. The cross track acceleration $a_{ct,i}$ at waypoint $w_i$ is a function of the velocity $v_i$ and the radius of curvature $r_i$.

$$a_{ct,i} = \frac{v_i^2}{r_i}$$

Constraining the cross track acceleration to be of magnitude less than $a_{max}$ results in a maximum allowable velocity $v_{i,allow}$ at $w_i$.

$$v_{i,allow} \leq \sqrt{a_{max} r_i}$$

To determine the radius of curvature n, waypoints $w_{i-1}$, $w_i$, and $w_{i+1}$ are used to define a circle through those waypoints. This circle is assumed to have radius of curvature $r_i$, because, as should be appreciated, this is a valid assumption when the waypoints are finely spaced relative to their curvature. Waypoints $w_{i-1}$ and $w_i$ define a first line, and waypoints $w_i$ and $w_{i+1}$ define a second line. The intersection of the perpendicular lines through the midpoints of the first line and the second line is at the center of the circle. Solving for the intersection yields the center point $c_i = (x_i^c, y_i^c)$.

$$x_i^c = \frac{(x_{i-1}^2 + y_{i-1}^2)(y_i - y_{i+1}) + (x_i^2 + y_i^2)(y_{i+1} - y_{i-1}) + (x_{i+1}^2 + y_{i+1}^2)(y_{i-1} - y_i)}{d_i}$$

$$y_i^c = \frac{(x_{i-1}^2 + y_{i-1}^2)(x_{i+1} - x_i) + (x_i^2 + y_i^2)(x_{i-1} - x_{i+1}) + (x_{i+1}^2 + y_{i+1}^2)(x_i - x_{i-1})}{d_i}$$

$$d_i = 2(y_{i+1}(x_i - x_{i-1}) + y_i(x_{i-1} - x_{i+1}) + y_{i-1}(x_{i+1} - x_i))$$

The denominator $d_i$ should be precomputed because its value is zero for any straight line segment where the radius of curvature is infinite. Otherwise, the center point can be computed using the equations above. The radius of curvature $r_i$ is the norm of the vector connecting $w_i$ and the center $c_i$. The direction of the curve can be computed for a finite radius of curvature $r_i$ using the sign of the cross product of the first and second line segments.

With reference to FIGS. 2 and 3, an example of how the radius of curvature $r_i$ is determined for waypoint $w_i$ is graphically illustrated. Referring to FIG. 2, a graph of a path is illustrated, wherein the path includes a plurality of waypoints. The graph includes an x-axis and a y-axis, where each point on the graph corresponds to a waypoint. The graph further shows a dashed box enclosing three waypoints: $w_{i-1}$, $w_i$, and $w_{i+1}$. These three waypoints will be used to illustrate how the radius of curvature $r_i$ of waypoint $w_i$ is determined.

Referring to FIG. 3, the three waypoints, $w_{i-1}$, $w_1$, and $w_{i+i}$, enclosed in FIG. 2 are shown. The first step is to determine first line 302 between waypoints $w_{i-1}$ and $w_i$ and second line 304 between waypoints $w_i$ and $w_{i+i}$, as shown in FIG. 2. Thereafter, an intersection between a first perpendicular line 306 and a second perpendicular line 308 is determined. The intersection corresponds to the center $c_i$ of a circle through waypoints $w_{i-1}$, $w_i$, and $w_{i+1}$. The first perpendicular line 306 is perpendicular to the first line 302 and runs through the midpoint of the first line 302. The second perpendicular line 308 is perpendicular to the second line 304 and runs through the midpoint of the second line 304. The radius of curvature $r_i$ is simply the length (or norm) of a line extending between the center $c_i$ of the circle and waypoint $w_i$.

Once the radius of curvature $r_i$ of a waypoint $w_i$ has been determined, it is possible to determine the maximum allowed speed $v_{i,allow}$ imposed by the cross track acceleration constraint $a_{max}$ at the waypoint $w_i$. As should be appreciated, this step is repeated for each waypoint $w_i$ to determine an allowable speed profile.

Referring back to FIG. 1, after the allowable speed profile of a path is determined (Step 104), the optimal speed profile of the path is determined (Step 106). This step entails determining the optimal speed profile satisfying piecewise linear along track acceleration constraints, as well as the minimum of the desired speed and of the allowable speed from the previous step. This step includes the sub steps of determining speed constraints (Step 112), determining a speed profile satisfying a negative along track acceleration constraint (Step 114), and updating the speed profile to satisfy a positive along track acceleration constraint (Step 116).

With respect to determining the speed constraint (Step 112), the speed at every waypoint is constrained by both the desired velocity $v_{i,max}$ and by the constraint imposed for the cross track acceleration constraint $V_{i,allow}$. The pre-path preferably defines the desired velocity. The desired velocity for a particular waypoint may, for example, be the speed limit along a road corresponding to the waypoint. Alternatively, the desired speed may be dependent upon the capabilities of the vehicle traversing the path, such as the top speed of the vehicle. Notwithstanding how the desired velocity is chosen, the minimum of these two constraints must be satisfied, whereby the maximum velocity $\bar{v}_i$ allowed at each waypoint is defined as shown below.

$$\bar{v}_i = \min(v_{i,max}, v_{i,allow})$$

With reference to FIG. 4, the various speed profiles discussed above are shown, wherein each waypoint is graphed according to speed and position along the path of FIG. 2. As shown on the graph, the allowed speed corresponds to the allowed speed according to the cross track acceleration constraint (i.e., Step 104). The desired speed corresponds to the desired speed, as discussed above. In this case, the desired speed for each waypoint was chosen arbitrarily for illustrative purposes. Lastly, the max speed (i.e., the speed constraint) corresponds to the minimum of the desired speed and the allowed speed.

Referring back to FIG. 1, after the speed constraint is determined (Step 112), a speed profile satisfying a negative along track acceleration constraint is first determined (Step 114). Thereafter, the speed profile from Step 114 is updated so as to satisfy a positive along track acceleration constraint (Step 116). However, as will be seen, these steps rely upon three equations: the time between waypoints $\Delta t$, the speed at the next waypoint $v_{i+1}$, and the along track acceleration $a_{at,i}$. Further, these steps rely upon Algorithm 1. Accordingly, these equations, as well as Algorithm 1, are presented below.

With respect to the above referenced equations, consider piecewise constant along track acceleration $a_{at,i}$ between waypoints $w_i$ and $w_{i+1}$. Given a current speed $v_i$ and a time between waypoints $\Delta t$, the speed at the next waypoint $v_{i+1}$ is as follows.

$$v_{i+1} = v_i + a_{at,i} \Delta t$$

Let the along track position of waypoint $w_i$ be $s_i$, measured from the beginning of the path, i.e. $\|w_{i+1} - w_i\|_2 = s_{i+1} - s_i$.

$$s_i = \sum_{j=1}^{i-1} \|w_{j+1} - w_j\|_2$$

To determine the time between waypoints $\Delta t$, one integrates the preceding equation for the speed at the next waypoint $v_{i+1}$ with respect to the time between waypoints $\Delta t$, thereby yielding the following equation.

$$\frac{1}{2} a_{at,i} \Delta t^2 + v_i \Delta t + (s_i - s_{i+1}) = 0$$

Solving for the time between waypoints $\Delta t$ yields the following equation. Note that only the positive root in the equation for the time between waypoints $\Delta t$ has a physical interpretation because the speeds must be positive.

$$\Delta t = \frac{-v_i \pm \sqrt{v_i^2 - 2a_{at,i}(s_i - s_{i+1})}}{a_{at,i}}$$

Substituting the equation for the time between waypoints $\Delta t$ in the equation corresponding to the speed at the next waypoint $v_{i+1}$ yields the following equation for the speed at the next waypoint $v_{i+1}$.

$$v_{i+1} = \sqrt{v_i^2 - 2a_{at,i}(s_i - s_{i+1})}$$

Solving for the acceleration to achieve a given change in speed over a given distance yields the following.

$$a_{at,i} = \frac{v_i^2 - v_{i+1}^2}{2(s_i - s_{i+1})}$$

With respect to Algorithm 1, the sweeping algorithm, Algorithm 1, operates by incrementing through the waypoints. At waypoint $w_i$, it first determines if it is possible to accelerate between $w_i$ and $w_{i+1}$. If it can accelerate, it accelerates as fast as required, or saturates at $a_{max}$. If it cannot accelerate, it next checks if it must slow down to satisfy $\bar{v}_{i+1}$. If it must, it slows down to that speed, using whatever acceleration necessary, even if using $a_{at,i} < -a_{max}$ is required. Note that it only violates $a_{max}$ to slow down. If it does not need to slow down, then it holds the current speed. Finally, it returns the computed speed profile v, acceleration profile a, and time profile $\Delta t$. Note that $\Delta t$ must be computed, because the algorithm is space-indexed. As should be appreciated, this algorithm runs in $O(N)$ time, where N is the number of waypoints.

---

Algorithm 1 Velocity-Plan-Sweep ($v_0$, s, v, $a_{max}$)

$v_i \leftarrow v_0$
for i = 1 to N do
  if $v_i < \bar{v}_i + 1$ then $$a_i \leftarrow \min\left(a_{max}, \frac{v_i^2 - (\bar{v}_i + 1)^2}{2(s_i - s_i + 1)}\right)$$

$$v_i + 1 \leftarrow \sqrt{v_i^2 - 2a_i(s_i - s_i + 1)}$$

$$\Delta t_i \leftarrow \frac{-v_i + \sqrt{v_i^2 - 2a_i(s_i - s_i + 1)}}{a_i}$$

else
    if $v_i > \bar{v}_i + 1$ then
      $v_i + 1 \leftarrow \bar{v}_i + 1$ $$a_i \leftarrow \frac{v_i^2 - v_i^2 + 1}{2(s_i - s_i + 1)}$$

$$\Delta t_i \leftarrow \frac{-v_i + \sqrt{v_i^2 - 2a_i(s_i - s_i + 1)}}{a_i}$$

else
      $v_i + 1 \leftarrow v_i$
      $a_i \leftarrow 0$ $$\Delta t_i \leftarrow \frac{s_i + 1 - s_i}{v_i}$$

end if
  end if
end for
return v, a, $\Delta t$

---

In view of the foregoing background, the next step is to determine an acceleration profile satisfying a negative along track acceleration constrain (Step 114). This step is accomplished by using Algorithm 1, shown above, to perform a reverse sweep of the waypoints. To begin, all along track positions are stored in s and all maximum speeds are stored in $\bar{v}$. As should be appreciated, maximum speeds are determined in Step 112 (i.e., the speed constraint). Thereafter, to prepare for sweeping through the points from the end to the beginning, these arrays, s and $\bar{v}$, are reversed in time, and s is negated. Once the inputs to Algorithm 1 are prepared, Algorithm 1 is run on the reversed data with $v_0 = \bar{v}_N$ to generate a speed profile and a corresponding along track acceleration profile a that satisfies $a_i > -a_{max} \forall i$. As should be appreciated, the result is that the speed profile satisfies the negative along track acceleration constraint $-a_{max}$.

After a speed profile satisfying a negative along track acceleration constraint is determined (Step 114), the speed profile is updated to further satisfy a positive along track acceleration constraint (Step 116) using Algorithm 1. This is accomplished via the use of a forward sweep of the waypoints. To begin, the speed constraint $\bar{v}$ is set to the resulting v from Step 114 (i.e., the reverse sweep). Thereafter, to prepare for sweeping through the points from beginning to end, the arrays, s and $\bar{v}$, are again reversed in time, and s is again negated. Once the inputs to Algorithm 1 are prepared, the Algorithm 1 is run on the forward data with $v_0 = \bar{v}_1$ to update the speed profile, and the corresponding along track acceleration profile, from the preceding steps, such that $a_i < a_{max} \forall i$. Additionally, in this sweep, $a_i < -a_{max} \forall i$ is not possible due to the speed limits imposed by the previous, reverse sweep.

Once these reverse and forward sweeps have been completed, the result is that the speed profile satisfies both the negative along track acceleration constraint and the positive along track acceleration constraint, as well as the speed constraint from Step 112. In other words, the optimal speed profile has been generated. Additionally, as should be appreciated, in the process of generating the speed profile, a corresponding acceleration profile and a corresponding time profile are generated. Further, while negative along track acceleration constraint $-a_{max}$ is shown as the negative of the positive along track acceleration constraint $a_{max}$, it should be appreciated that they need not be symmetrical.

With reference to FIG. 5, a graphical illustration of the speed profile after sweep two (i.e., the optimal speed profile) of the graph of FIG. 2 is shown. FIG. 5 further includes the speed profile after sweep one and the speed constraint from Step 112. The speed constraint imposes an upper bound on speeds for the first sweep, such that the speeds within the speed profile of the first sweep do not exceed the desired speed and the cross track acceleration constraint. The speed profile after the first sweep imposes an upper bound on speeds for the second sweep, such that the speeds within the speed profile of the second sweep do not exceed the desired speed, the cross track acceleration constraint, and the negative along track acceleration constraint. Thus, as should be appreciated, speeds within the speed profile of sweep one may not exceed speeds in the speed constraint profile, and speeds within the speed profile of sweep two may not exceed speeds in the speed profile of sweep one. The speed profile after sweep one shows acceleration from right to left until the speed meets the speed constraint. The speed profile after sweep two accelerates from left to right until the speed meets the speed profile from the first sweep.

After the optimal speed profile has been determined (Step 104), the method may proceed according to one or both of two optional steps. The first option is to determine the optimal travel time t for traversal of the path (Step 108). As should be appreciated, this is as simple as summing the time between waypoints $\Delta t$.

$$t = \sum_{i=2}^{N} t_i - t_{i-1}$$

Using the optimal travel time t provides a far better approximation of the time need to traverse a path than traditional approximations, because traditional approximations fail to account for the curvature of a road, and the corresponding need to slow for curves and/or turns.

Turning now to another aspect of the present application, disclosed is an option which allows for a determination of the comfort level of the path (Step 110). This step includes the sub step of determining the frequency response of the path (Step 118). To determine the frequency response of a path, one of two methods may be employed. The first is to collect real-time driving data for a path. As should be apparent, under such a method, one needs to physically traverse the path and collect data about the frequency response of the path. Alternatively, and preferably, the frequency response is determined from the optimal speed profile, and corresponding cross track and/or along track acceleration profiles. Using this approach, acceleration profiles are converted so they are time-indexed, as opposed to space indexed. Thereafter, to get the frequency response, a digital filtering method, such as finite impulse response, Fourier transform, and so forth, is performed on the relevant acceleration profiles.

Figure 18:
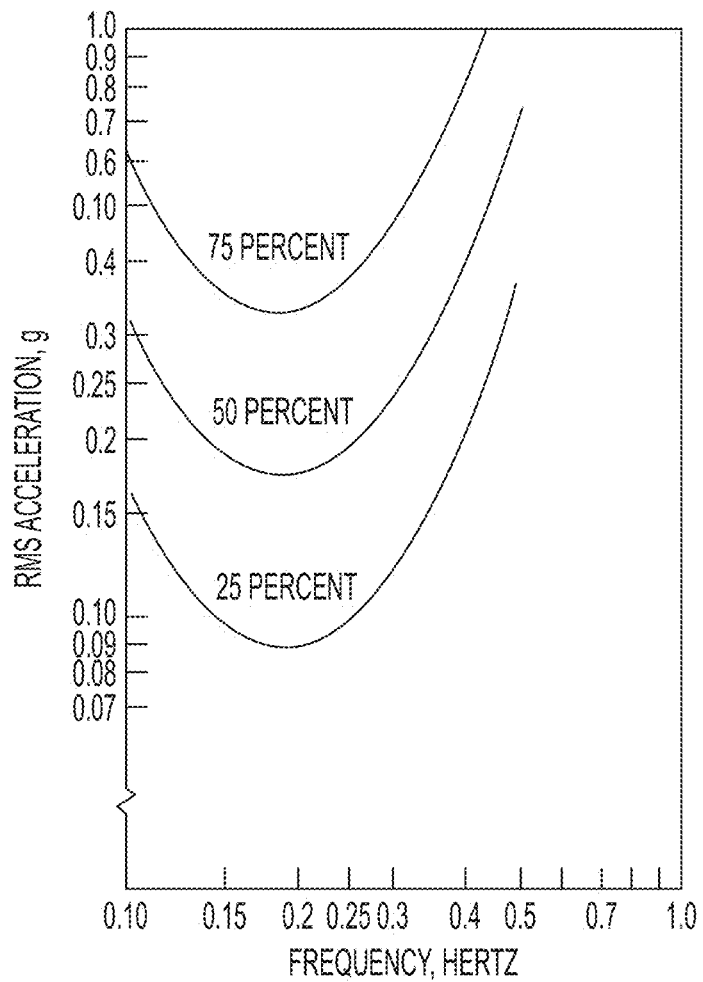
FIG. 18 is a graph showing frequency (in hertz) versus acceleration (in gravitational units), taken from a NASA study detailing those frequencies prone to causing motion sickness.

With the frequency response, one may determine whether the frequency response includes frequencies prone to causing motion sickness. As previously mentioned, a study from NASA released a table (see of FIG. 18) detailing those frequencies prone to causing motion sickness. Particularly, FIG. 18 plots frequency (in hertz) versus acceleration (in gravitational units). The generated curves (25 percent, 50 percent, 75 percent) represent equal motion sickness contours based on percentage of emesis within 2 hours for 500 male subjects exposed to vertical sinusoidal motion. As can be seen, a significant increase in motion sickness occurs approximately between 0.15 hertz and 0.25 hertz with a peak at approximately 0.20 hertz. Based upon this determination, an approximation of the comfort level one traversing the path would experience can be derived. Additionally, or in the alternative, a comfort level can be derived based upon whether the frequency response includes higher frequencies. Naturally, the higher the frequencies present, the more curves and/or turns roads along a path have, and the more challenging it is to traverse the roads. Accordingly, a comfort level can be based upon the higher frequencies. The data shown in FIG. 18 is a classically cited motion sickness example. However, other studies may define different levels. It is to be appreciated, therefore, the above is simply an example, and the present concepts may be implemented using data from other such studies. It is also mentioned that automobile tires can typically handle up to 0.3 g's while staying within most users' comfort levels.

Depending upon the determined comfort level, a user may be notified if the comfort level falls below a predefined threshold. In one embodiment, this threshold is set by the user while in other embodiments the threshold is set globally for all users. Alternatively, a user may request the comfort level of a path after viewing the path. In yet another alternative, a new path is generated automatically when the comfort level of the path falls below a predefined threshold. In yet another alternative, while a path is being generated, the frequency response and traversal time of a sub-path (e.g., a road) may be used to penalize the sub-path. For example, a ground based route planning system may find that a 2 minute stretch of curvy road is acceptable to save 30 minutes of travel time, whereas a 30 minute stretch of curvy road is not acceptable to save 30 minutes of travel time. In this way, the frequency response of a path is advantageously employed to improve the comfort of a user traversing a path.

According to another exemplary embodiment, the exemplary method discussed above are modified to analyze and augment the databases of ground based route planning systems. According to one embodiment, the exemplary method discussed above may be used to pre-compute the speed profiles, acceleration profiles, time profiles, frequency responses and/or driver comforts for the paths (e.g., roads) comprising a database of a ground based route planning system. Thereafter, ground based route planning systems can use the augmented databases to determine the path between two points (e.g., a start address and an end address), whereby sub-paths (e.g., roads) may be penalized due to the pre-computed data, e.g., the frequency responses. This advantageously allows ground based route planning systems to take into account the curvature of a road while generating a path between two points, such that the path may be based upon, for example, more accurate travel times, the frequency response of sub-paths (e.g., roads), and driver comfort. Further, as should be appreciated, by pre-computing the foregoing data, the effect on the time and space complexity of the path generation algorithms used by ground based route planning systems should be negligible. In an alternative embodiment, the databases of ground based route planning systems are augmented while generating paths between two points (i.e., at runtime). In yet another alternative embodiment, the speed profiles, acceleration profiles, time profiles, frequency responses and/or driver comforts for the sub-paths (e.g., roads) intermediate and relevant to a path between two points are generated while generating the path between the two points (i.e., at runtime).

Figure 6:
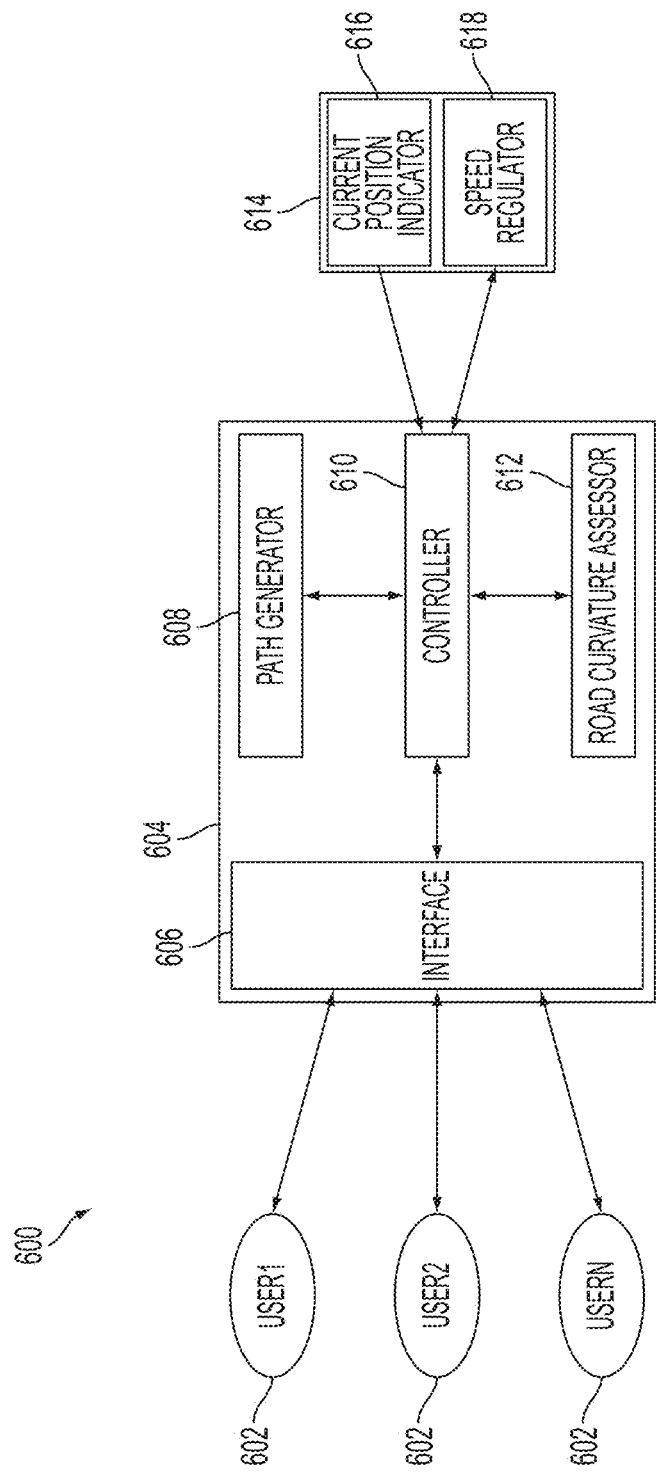
FIG. 6 is an exemplary system for assessing the curvature of a path.

With reference to FIG. 6, an exemplary system 600 for assessing the curvature of a path as disclosed above is illustrated. The system includes one or more users 602, a ground based route planning system 604 and an automobile 614. The ground based route planning system includes an interface 606, a path generator 608, a controller 610 and a road curvature assessor 612.

The interface 606 interfaces with the one or more users 602 and receives requests from the one or more users 602. The interface 606 may be a web interface such as MapQuest™. Alternatively, the interface 606 may be a computer interface, such as that of a portable GPS unit like TomTom™. The requests may be requests for driving directions, the comfort level of a path, the time of travel of a path, and/or other like requests. If a request is for driving directions, the request includes a start point and an end point. If the request is for the comfort level and/or travel time of a path, the request includes the path or the location of the path. The path generator 608 generates a path in response to a path request, e.g., a request for driving directions. The path generator 608 may generate a path using A* with visibility graphs, fast marching with gradient descent, or any other algorithm operative generate a path between two points. The road curvature assessor 612 assesses the curvature of a path as described in FIG. 7, below, in response to an assessment request.

The controller 610 acts to bridge and/or relay communications between the components of the grounds based route planning system 604. The controller 610 receives the requests from the one or more users via the interface 606. Thereafter, the controller 610 determines how to respond to the request and relays the request as appropriate. If the controller 610 receives a request for driving directions (i.e., a path request), the controller 610 relays the request to the path generator 608 and returns the generated path to the appropriate user via the interface 606. If the controller 610 receives a request for a travel time of a path or a comfort level of a path (i.e., an assessment request), the next step depends upon the information received in the request. If the request includes a path, the controller 610 simply relays the request to the road curvature assessor 612 and responds to the request, via the interlace 606, with the assessment of the road curvature assessor 612. However, if the request also includes a request for driving directions (i.e., a path request), the controller 610 first sends the request to the path generator 608 to generate the path. Thereafter, the controller relays the path from the path generator 608 to the road curvature assessor 612 and responds to the request with the path and the assessment of the road curvature assessor 612.

The ground based route planning system 604 may further accompany the automobile 614. The automobile 614 includes current position indicator 616 and/or speed regulator 618. The current position indicator 616 may provide the controller 610 of the ground based route planning system 604 with the current position of the automobile 614 along a path generated by the ground based route planning system. The current position indicator 616 may be a GPS unit and/or any other system for ground based navigation. With the current position of the automobile 614 along the path, the controller 610 can use an optimal speed profile of the path to control a speed regulator 618 of the automobile 614. The speed regulator 618 includes, for example, cruise control. This advantageously allows an automobile 614 to slow down for turns when using the speed regulator 618, such as cruise control. Alternatively, the controller 610 may facilitate a "one-sided cruise control" where the controller 610 imposes a speed limit on the driver based on user-provided parameters or on preprogrammed parameters. For example, such parameters may limit the ability of a driver to enter a curve too fast for the road conditions. As should be appreciated, this advantageously improves safety. According to another embodiment the controller 610 can provide a driver with an audio and/or visual warning to slow down. This also advantageously improves safety. Notwithstanding that the foregoing discussion contemplates the controller coordinating the foregoing features, the controller may simply provide the automobile 614 with the speed profile for a path, whereby the automobile 614 may carry out one or more of the foregoing features, such as controlling the speed regulator 618.

Figure 7:
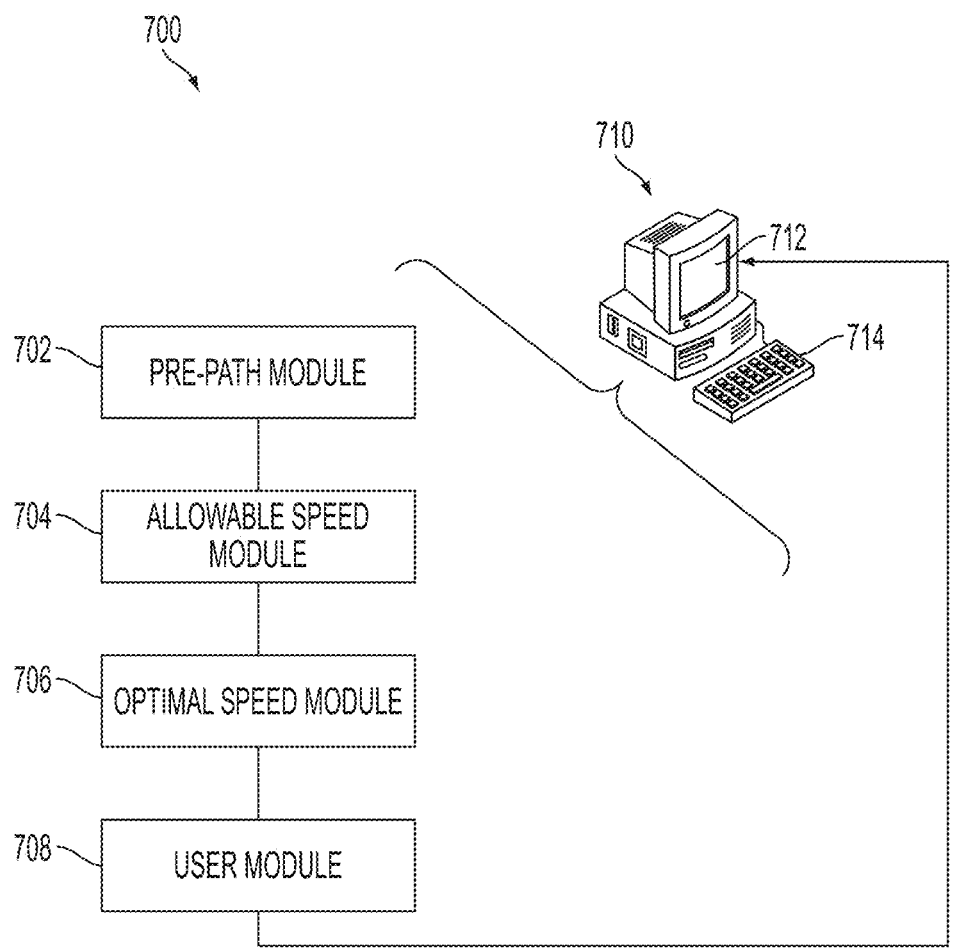
FIG. 7 is an exemplary road curvature assessor employing the exemplary method for assessing road curvature of a path.

With reference to FIG. 7, an alternative embodiment of system 700 for assessing the curvature of a path is illustrated. The system 700 is suitably embodied by a computer 710, or other digital processing device including a digital processor, such as a microprocessor, microcontroller, graphic processing unit (GPU), etc. and storage. In other embodiments, the system 700 for assessing road curvature may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices such as an illustrated keyboard 714 for receiving user input to control the road curvature assessor, and further includes or is operatively connected with one or more display devices such as an illustrated display 712 for displaying output generated based on the output of the road curvature assessor 700. In other embodiments, the input for controlling the road curvature assessor 700 is received from another program running previously to or concurrently with the road curvature assessor 700 on the computer 710, or from a network connection, or so forth. Similarly, in other embodiments the output may serve as input to another program running subsequent to or concurrently with system 700 on the computer, or may be transmitted via a network connection, or so forth.

The road curvature assessor system 700 includes an optional pre-path module 702; an allowable speed module 704; an optimal speed module 706; and a user module 708. When used, the optional pre-path module 702 receives a pre-path from a source external (e.g., the Internet) to the road curvature assessor system 700, and generates a path from the pre-path as described in connection with Step 102 of FIG. 1. Thereafter, the allowable speed module 704 receives the path from the pre-path module 702. If the optional pre-path module 702 is not employed, the allowable speed module 704 receives a path from a source external (e.g., the Internet) to the road curvature assessor system 700, and generates an allowable speed profile. The allowable speed profile is preferably generated as described in connection with Step 104 of FIG. 1. The optimal speed module 706 receives the path and the allowable speed profile from the allowable speed module 704. The optimal speed module 706 thereafter uses the received path and allowable speed profile to generate an optimal speed profile satisfying acceleration constraints and speed constraints. The optimal speed module generates the optimal speed profile as described in connection with Step 106 of FIG. 1. Thereafter, the optimal speed profile is output for display, printout and/or implementation into additional decision making mechanisms, such as planners. Alternatively, after the optimal speed profile is generated, the user module 708 receives the optimal speed profile, and a corresponding acceleration profile, from the optimal speed module. Additionally, the user module 708 receives an external request for one or more of the following: an optimal travel time, a comfort level, or other like requests. Depending upon the request, the user module 708 analyzes the speed profile and/or the acceleration profile as discussed in connection with Steps 108 and 110 of FIG. 1. Thereafter, a response to the request is output for display, printout and/or implementation into additional decision making mechanisms, such as planner.

In some embodiments, the exemplary methods, discussed above, the road curvature assessor employing the same, and so forth, of the present application are embodied by a storage medium storing instructions executable (for example, by a digital processor) to implement the exemplary methods and/or road curvature assessor. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

With reference to FIGS. 8-17, experimental test results of the time optimal sweeping algorithm, discussed above, are illustrated. The time optimal sweeping algorithm was applied to two exemplary path planning algorithms: an A* algorithm and a fast marching algorithm. Further, all the experiments were run using a 3.4 GHz Pentium IV computer. As will be discussed with more detail below, the time to run the time optimal sweeping algorithm demonstrates that this algorithm is computationally negligible, as expected by its O(n) time complexity.

Figure 8:
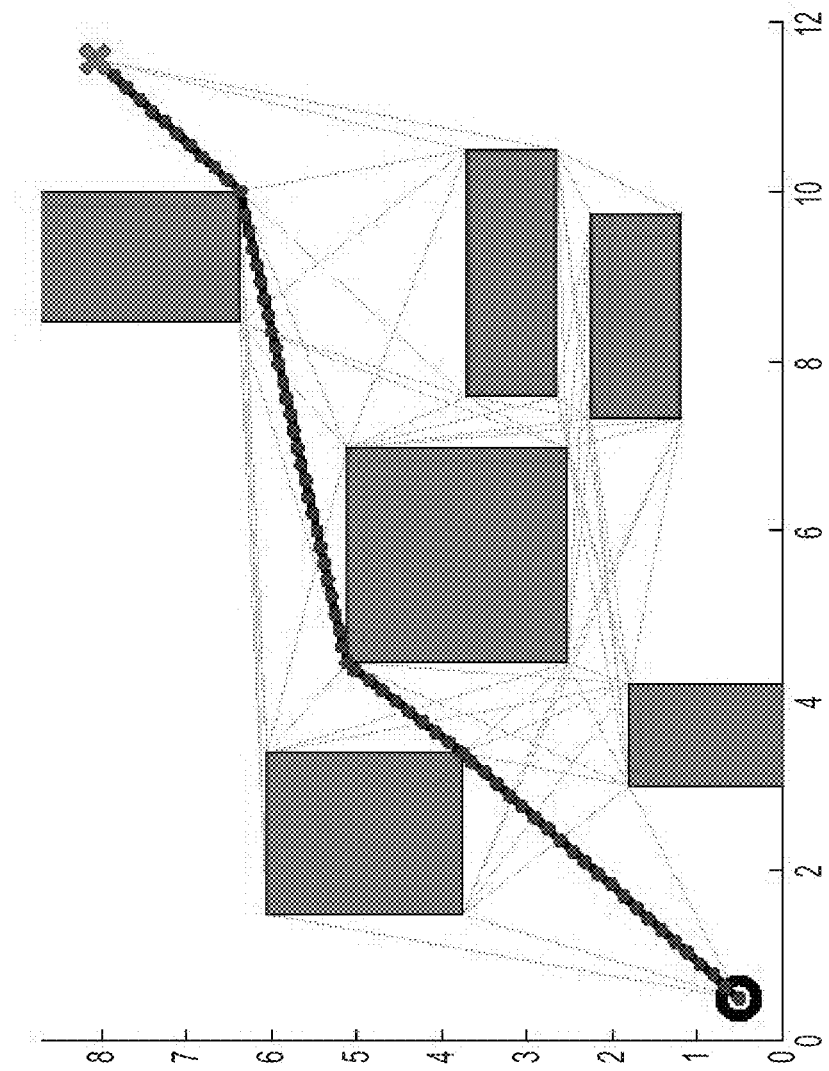
FIGS. 8-9 are graphical illustrations of paths generated in accordance with two exemplary algorithms for finding the shortest path between two points.

Considering the path generated using A* to find the shortest path through a visibility graph, shown in FIG. 8, the generation of the shortest path required under 20 ms using Matlab. However, this method ignored dynamic constraints, which would require an automobile to slow to a halt at sharp corners. To run the optimum time sweeping algorithm, the shortest path was discretized at 0.2 m increments, resulting in a computation time of under 1 ms to run optimum time sweeping. The results are shown in FIGS. 10-13. The minimum time to traverse the path under acceleration and speed constraints was 13.6 sec.

One drawback to the presented approach is that corners may be cut, depending on the fineness of the discretization, a problem common to many path planning algorithms. However, the computational cost for choosing a sufficiently fine discretization is low, given the low run time of the sweeping algorithm, whereby an arbitrary precision may be used to avoid obstacles. The effect of increasing the precision of the space discretization is that it increases the total time to complete the trajectory, as the velocity slows to zero at each turn in the underlying desired path. In some problem formulations, it is desirable for corners to be cut if there is sufficient margin in the definition of obstacles used in generating the original plan. This allows sharp corners in the paths to be traversed without stopping, which is only advantageous when there are sharp corners in the path as in the case of the visibility graph.

Figure 9:
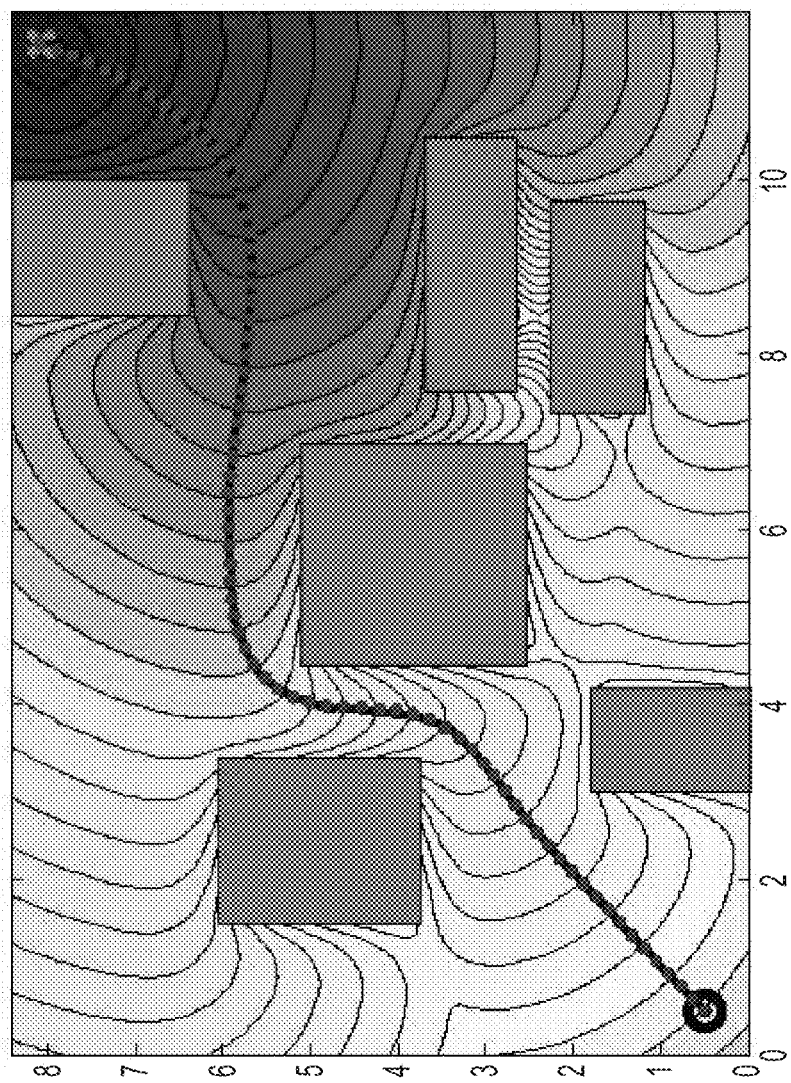
Figure 10:
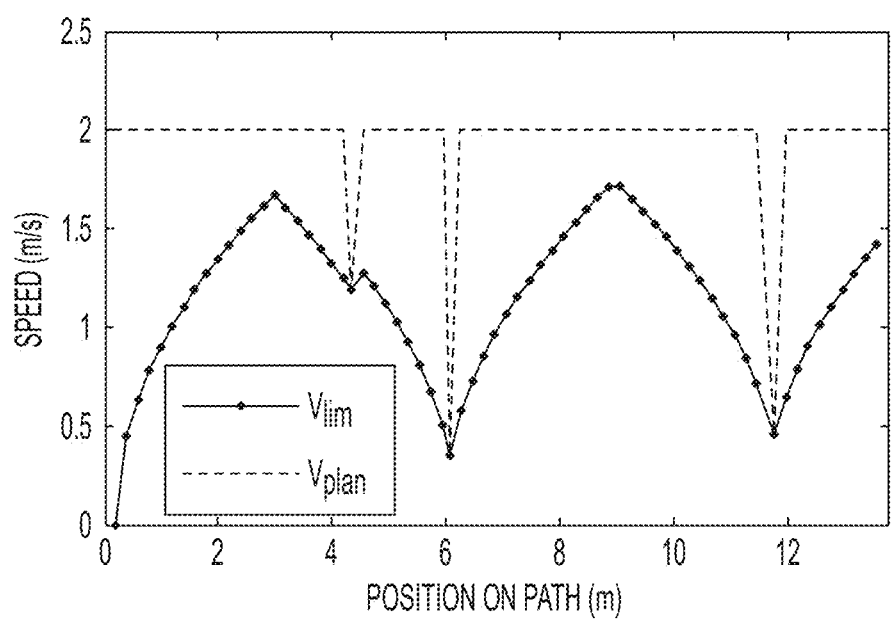
FIGS. 10-13 are graphical illustrations of the results of performing the exemplary method of the present application on a path generated in accordance with the first exemplary algorithm illustrated in FIG. 8.
Figure 11:
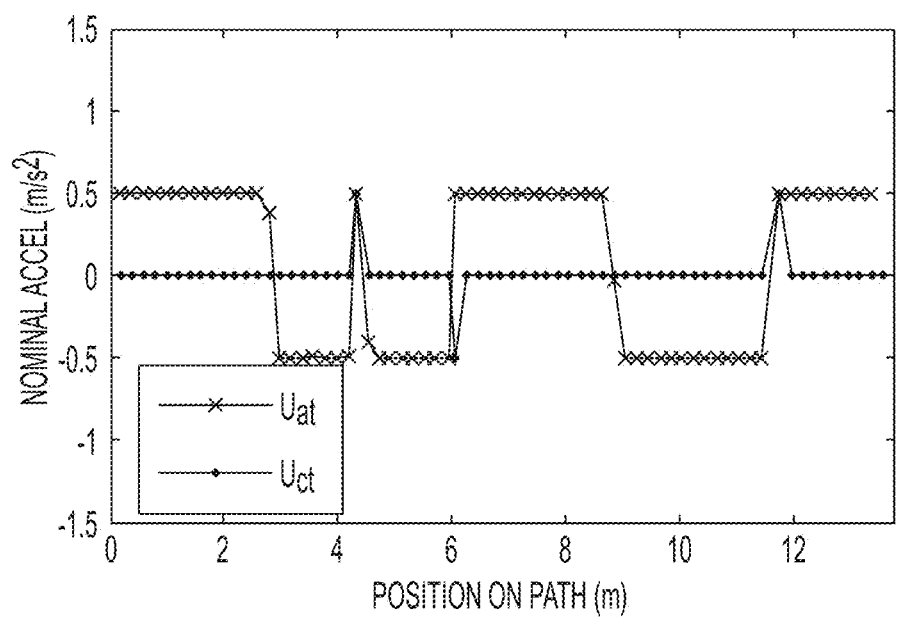
Figure 12:
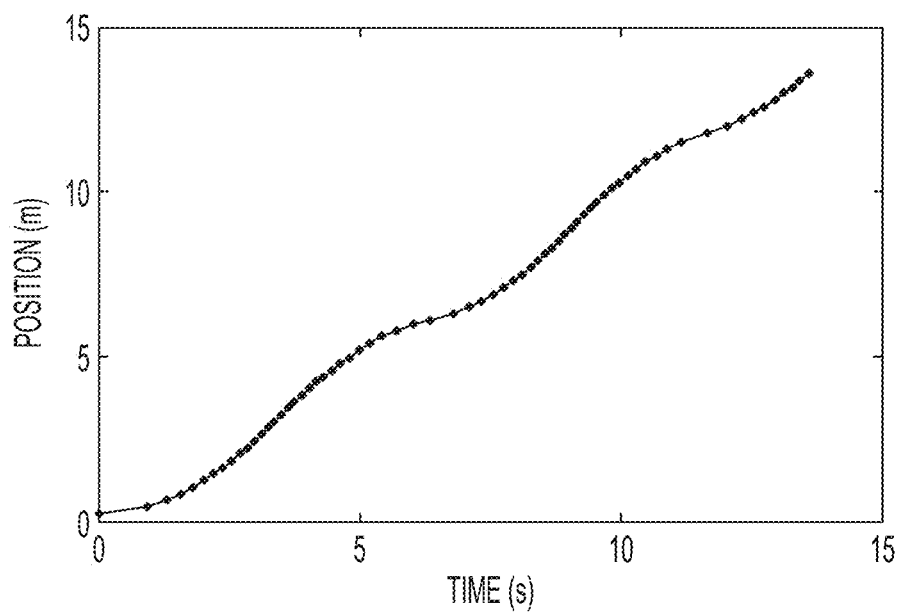
Figure 13:
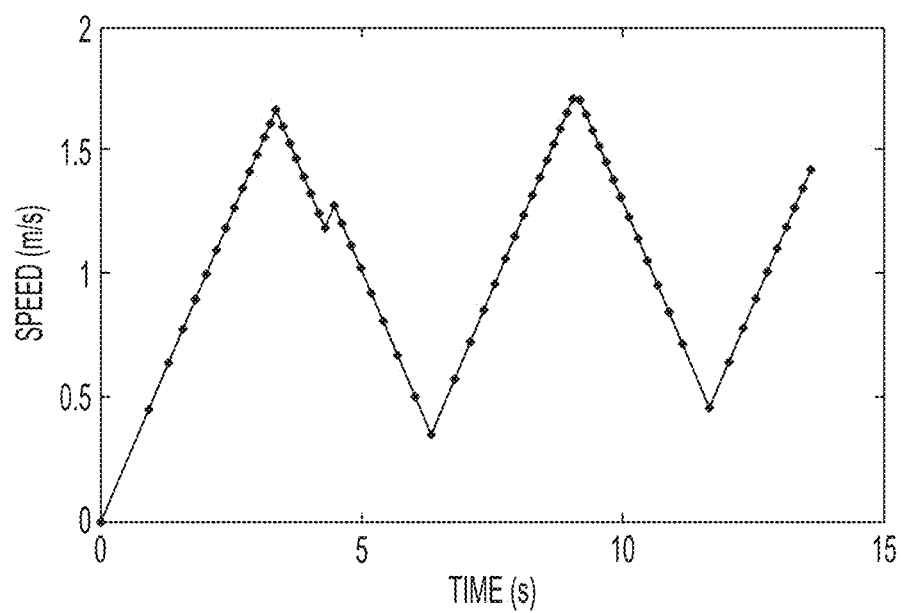
Figure 14:
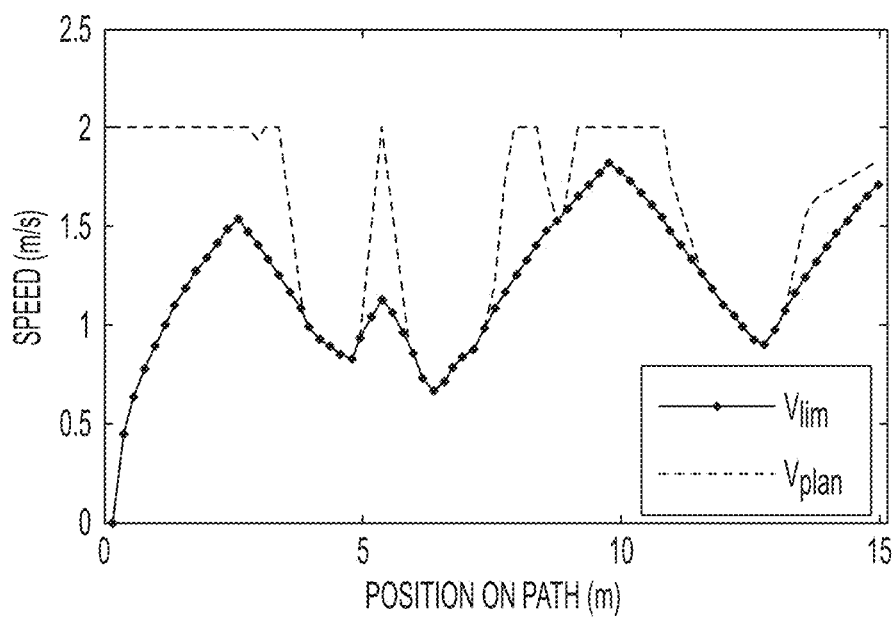
FIGS. 14-17 are graphical illustrations of the results of performing the exemplary method of the present application on a path generated in accordance with the second exemplary algorithm illustrated in FIG. 9.
Figure 15:
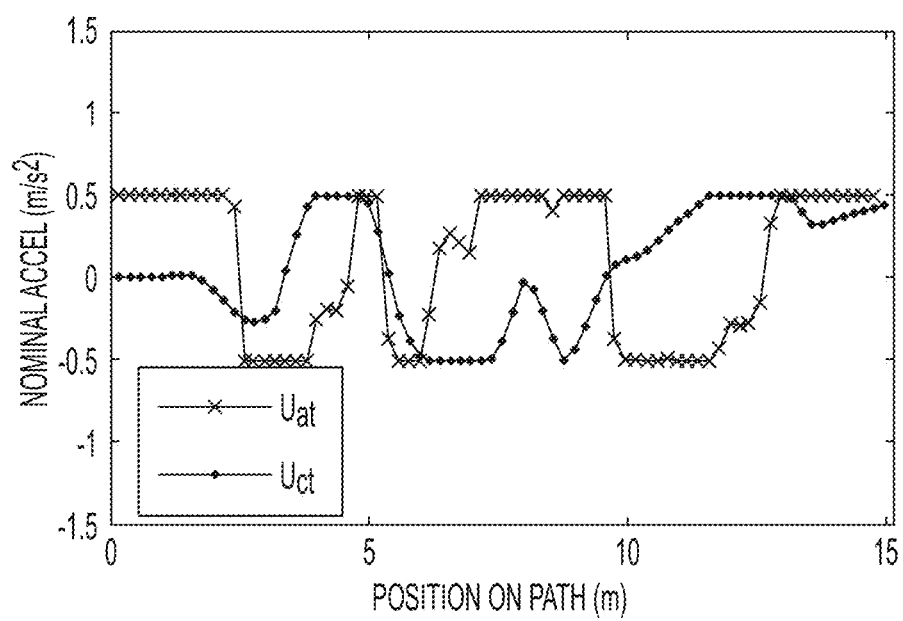
Figure 16:
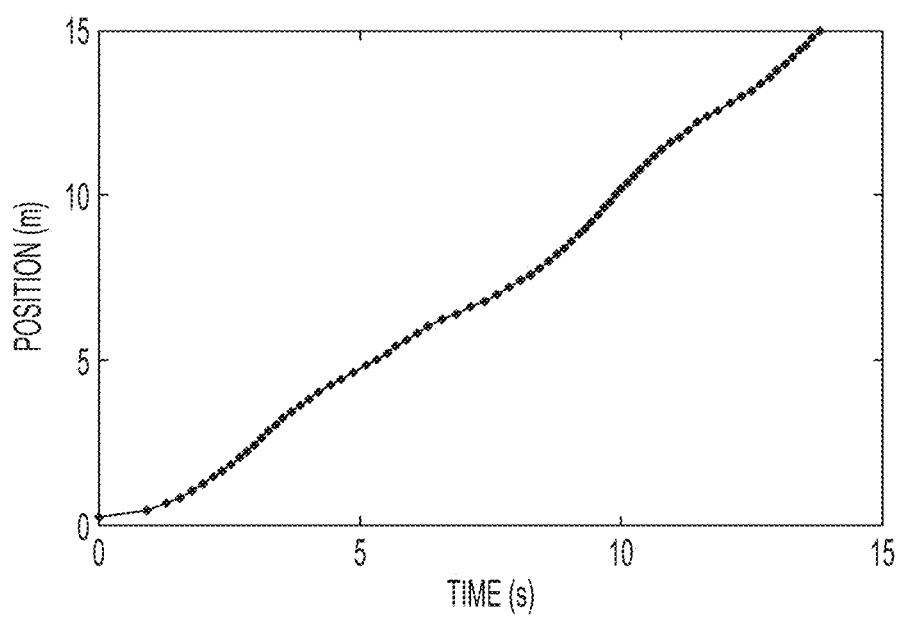
Figure 17:
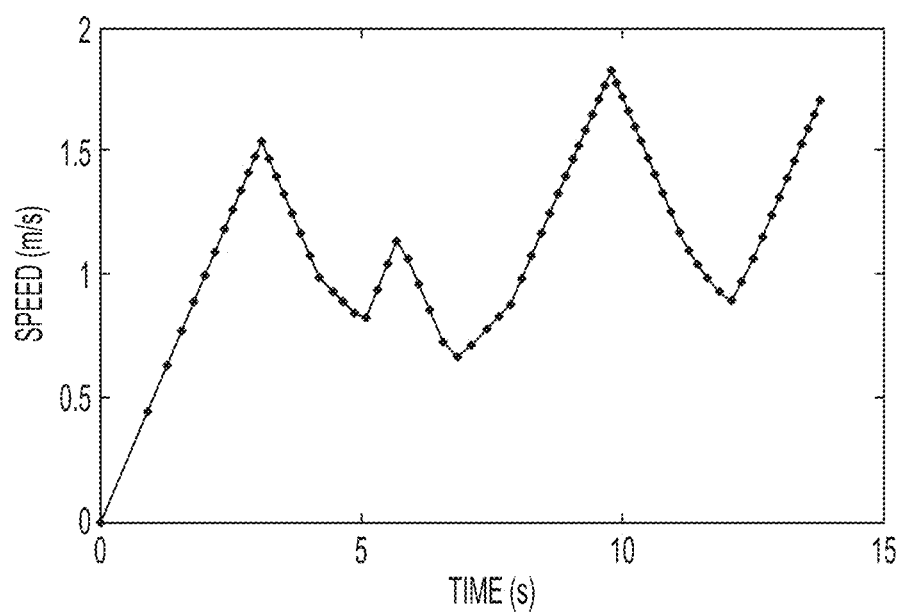

Considering the path generated using fast marching with the planar wave approximation, shown in FIG. 9, this method, using a discrete grid, propagates the cost to reach the goal from the goal outward, increasing with distance. Close proximity to obstacles increases this cost, resulting in the refraction of the wave front around surfaces. Using the resulting cost map, gradient descent is used to find the best path to the target, according to the cost map. In the example shown, the complete path finding algorithm again ran in under 20 ms. Due to the aversion to obstacles, this cost map is not exactly the time to the goal because the vehicle is penalized for being close to obstacles. To run the optimum time sweeping algorithm, the fast marching path was discretized at 0.2 m increments again, and resulted in a computation time of under 1 ms.

The results are shown in FIGS. 14-17. The minimum time to traverse the path under acceleration and speed constraints was 13.8 sec. The results for fast marching differ from those of the visibility graph. Although the aversion to obstacles results in smoother paths, the paths are always longer than the visibility graph. As a result, sometimes the visibility graph is faster, and sometimes the fast marching path is faster. The aversion to obstacles causes fast marching to tend to avoid going through small gaps when possible, which is advantageous if there are winding corners, but hurts performance if there is a simple gap. The resulting minimum time acceleration commands for the fast marching path varied much more smoothly than for the visibility graph, due to a lack of corners. Although the maximum velocity constraint due to cross track acceleration was active for more time than it was for the visibility graph path, the minimum values were not as low, so the average speeds were close to equal for the two examples.

In both examples, the computation time to find a path through the environment was low because dynamic constraints were first ignored to find the path, and then included by the optimum time sweeping algorithm. By separately considering vehicle dynamics and path plans, the overall paths are not optimal. However, given the already good paths, the optimum time sweeping algorithm generates a control input and speed plan that traverses the path in minimum time.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for assessing road curvature in response to requests from one or more users, said system comprising:
    an interface operative to communicate with the one or more users, wherein the interface receives the requests from the one or more users;
    a path generator operative to generate a first path between a first point and a second point in response to a path request, wherein the first path includes a plurality of waypoints;
    a road curvature assessor operative to generate an optimal speed profile for a second path in response to an assessment request, wherein the optimal speed profile for the second path satisfies both acceleration constraints and speed constraints, wherein generating the optimal speed profile includes:
        sweeping through the plurality of waypoints in a first direction to determine an along track acceleration profile, wherein the along track acceleration profile satisfies a negative acceleration constraint; and,
        sweeping through the plurality of waypoints in a second direction to update the along track acceleration profile wherein the updated along track acceleration profile satisfies both a negative acceleration constraint and a positive acceleration constraint; and,
    a controller operative to respond to each of the requests via the interface, wherein said controller selectively relays the requests to the path generator and/or the road curvature assessor, wherein said controller selectively relays paths from the path generator to the road curvature assessor;
    wherein the controller is configured to provide one or more of:
        notify a user in response to the comfort level being less than a predetermined level;
        provide an indication of he comfort to the user in response to receiving the request;
        generate a new path including a comfort level greater than a predetermined level in response to the comfort level of the path being less than the predetermined level; and
        impose speed limits on a driver of a vehicle based on the optimal speed profile.

2. The system of claim 1, wherein the road curvature assessor includes an allowable speed module adapted to determine an allowable speed profile of the second path and an optimal speed module adapted to determine the optimal speed profile of the second path, wherein the optimal speed profile is dependent upon the allowable speed profile.

3. The system of claim 1, wherein the interface communicates with the one or more users via a communications network.

4. The system of claim 1, wherein the interface communicates with the one or more users via a user input device.

5. The system of claim 1, wherein the acceleration constraints include a cross track acceleration constraint and an along track acceleration constraint.

6. The system of claim 1, wherein the acceleration constraints are selectable by the one or more users.

7. The system of claim 1, wherein the controller controls a speed regulator of an automobile based upon the optimal speed profile and a current position input.

8. The system of claim 1, wherein the controller provides an optimal travel time of a third path corresponding to a request, wherein the optimal travel time is based upon an optimal speed profile corresponding to the third path.

9. The system of claim 1, wherein the controller provides a comfort level of a fourth path corresponding to a request, wherein the comfort level is based upon a frequency response of the fourth path corresponding to the request.

10. A system for assessing road curvature of a path, wherein said path includes a plurality of waypoints, wherein each of said plurality of waypoints includes a desired speed, said system comprising:

an allowable speed module adapted to determine an allowable speed profile of the path, wherein said allowable speed profile includes an allowable speed for the each of the plurality of waypoints, wherein the allowable speed for the each of the plurality of waypoints satisfies a cross track acceleration constraint; and, an optimal speed module adapted to determine an optimal speed profile of the path, wherein said optimal speed profile includes an optimal speed for the each of the plurality of waypoints, wherein the optimal speed for the each of the plurality of waypoints satisfies both an along track acceleration constraint and a speed constraint, wherein said speed constraint is a minimum of the desired speed and the allowable speed;

wherein determining the optimal speed profile includes:

sweeping through the plurality of waypoints in a first direction to determine an along track acceleration profile wherein the along track acceleration profile satisfies a negative acceleration constraint; and, sweeping through the plurality of waypoints in a second direction to update the along track acceleration profile wherein the updated along track acceleration profile satisfies both a negative acceleration constraint and a positive acceleration constraint; and wherein the controller is configured to provide one or more of:

notify a user in response to the comfort level being less than a predetermined level;

provide an indication of the comfort level to the user in response to receiving the request;

generate a new path including a comfort level greater than a predetermined level in response to the comfort level of the path being less than the predetermined level; and impose speed limits on a driver of a vehicle based on the optimal speed profile.

* * * * *